United States Patent
Bhat et al.

(10) Patent No.: US 10,800,279 B2
(45) Date of Patent: Oct. 13, 2020

(54) PORTABLE CHARGING SYSTEM AND CHARGING METHOD

(71) Applicant: Ford Global Technologies, LLC, Dearborn, MI (US)

(72) Inventors: Krishna Prasad Bhat, Canton, MI (US); Michael W. Degner, Novi, MI (US); Allan Roy Gale, Livonia, MI (US); Ke Zou, Canton, MI (US); Xi Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 16/130,071

(22) Filed: Sep. 13, 2018

(65) Prior Publication Data

US 2020/0086747 A1    Mar. 19, 2020

(51) Int. Cl.
| | | |
|---|---|---|
| H01M 10/44 | (2006.01) | |
| H01M 10/46 | (2006.01) | |
| B60L 53/30 | (2019.01) | |
| H02J 7/00 | (2006.01) | |
| B60L 53/22 | (2019.01) | |
| B60L 53/14 | (2019.01) | |

(52) U.S. Cl.
CPC ............. *B60L 53/30* (2019.02); *B60L 53/14* (2019.02); *B60L 53/22* (2019.02); *H02J 7/0027* (2013.01)

(58) Field of Classification Search
CPC ........ H02J 7/0013; H02J 7/0021; H02J 7/355; H02J 7/0042
USPC .................. 320/103, 104, 105, 138, 116, 118
See application file for complete search history.

(56) References Cited

U.S. PATENT DOCUMENTS

| | | |
|---|---|---|
| 6,384,573 B1 | 5/2002 | Dunn |
| 6,660,967 B2 | 12/2003 | Brofft et al. |
| 8,710,795 B2 | 4/2014 | Scheucher |
| 9,592,742 B1 | 3/2017 | Sosinov et al. |
| 2005/0115748 A1 | 6/2005 | Lanier |
| 2009/0252994 A1 | 10/2009 | Livingston |
| 2011/0025267 A1 | 2/2011 | Kamen et al. |
| 2011/0055037 A1 | 3/2011 | Hayashigawa et al. |
| 2014/0375272 A1 | 12/2014 | Johnsen et al. |

(Continued)

FOREIGN PATENT DOCUMENTS

| | | |
|---|---|---|
| KR | 1020110080308 | 7/2011 |
| KR | 1020160057652 | 5/2016 |

OTHER PUBLICATIONS

Instruction Manual "Battery Booster Pack" by Battery Tender, no date. www.batterytender.com (Year: 2016).*

(Continued)

*Primary Examiner* — Edward Tso
(74) *Attorney, Agent, or Firm* — David Kelley, Esq.; Carlson, Gaskey & Olds. P.C.

(57) ABSTRACT

An exemplary charging system includes, among other things, a first portable charger that electrically couples to an electrified vehicle to charge a traction battery of the electrified vehicle while a second portable charger is providing electrical energy to charge the traction battery. An exemplary charging method includes, among other things, electrically coupling both a first and a second portable charger to an electrified vehicle to charge a traction battery of the electrified vehicle using electrical energy from both the first and the second portable chargers.

18 Claims, 8 Drawing Sheets

(56) References Cited

U.S. PATENT DOCUMENTS

2017/0043670 A1     2/2017   Zenner et al.
2017/0069900 A1     3/2017   Casebolt et al.

OTHER PUBLICATIONS

Battery Tender, "Batteries and Chargers Connected in Series and Parallel," Apr. 9, 2002 (Year: 2002).*

Quora electronic forum, "can I add two battery chargers of the same rating in parallel to speed up my charging time?" Feb. 27, 2017 (Year: 2017).*

* cited by examiner

PORTABLE CHARGING SYSTEM AND CHARGING METHOD

TECHNICAL FIELD

This disclosure relates generally to a portable charger that can be used to charge a traction battery of an electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), and battery electric vehicles (BEVs).

The traction battery is a relatively high-voltage battery that selectively powers the electric machines and other electrical loads of the electrified vehicle. The traction battery can include battery arrays each including a plurality of battery cells that store energy. Some electrified vehicles, such as PHEVs, can charge the traction battery from an external power source.

SUMMARY

A charging system according to an exemplary aspect of the present disclosure includes, among other things, a first portable charger that electrically couples to an electrified vehicle to charge a traction battery of the electrified vehicle while a second portable charger is providing electrical energy to charge the traction battery.

Another example of the foregoing system includes the second portable charger. The first and second portable chargers each include a storage battery and an electronic conversion module. The electronic conversion module is configured to adjust parameters of electrical energy received from the respective storage battery to provide adjusted electrical energy that charges the traction battery.

In another example of any of the foregoing systems, the storage batteries of the first and second portable chargers are connected in parallel when charging the traction battery.

In another example of any of the foregoing systems, electrical energy output from the electronic conversion modules is connected in parallel when charging the traction battery.

Another example of any of the foregoing systems includes a controller module of the first portable charger that controls electrical energy output from the electronic conversion module of the second portable charger.

In another example of any of the foregoing systems, the controller module of the first portable charger is configured to adjust a current of the electrical energy output from the electronic conversion module of the second portable charger.

In another example of any of the foregoing systems, the storage batteries of the first and second portable chargers are connected in parallel when charging the traction battery. Electrical energy output from the electronic conversion modules is combined in parallel when charging the traction battery.

In another example of any of the foregoing systems, electrical energy output from the electronic conversion modules is connected in series when charging the traction battery.

Another example of any of the foregoing systems includes the second portable charger. The first and second portable chargers are interconnected to each other when charging the traction battery.

Another example of any of the foregoing systems includes the second portable charger and at least one third portable charger. The first portable charger is configured to electrically couple to the electrified vehicle to charge the traction battery while the second portable charger is providing electrical energy to charge the traction battery, and while the at least one third portable charger is also providing electrical energy to charge the traction battery.

In another example of any of the foregoing systems, the electrified vehicle is a first electrified vehicle and the first portable charger is configured to electrically couple to both the first electrified vehicle and a second electrified vehicle to charge traction batteries of the first and second electrified vehicles simultaneously.

In another example of any of the foregoing systems, the first portable charger is configured to feed electrical energy to an electrical grid.

A charging method according to yet another exemplary aspect of the present disclosure includes, among other things, electrically coupling both a first and a second portable charger to an electrified vehicle to charge a traction battery of the electrified vehicle using electrical energy from both the first and the second portable chargers.

Another example of the foregoing method includes receiving electrical energy from a storage battery of the first portable charger and using an electronic conversion module of the first portable charger to provide adjusted electrical energy that is used to charge the traction battery of the electrified vehicle. The method further includes receiving electrical energy from a storage battery of the second portable charger and using an electronic conversion module of the second portable charger to provide adjusted electrical energy that is used to charge the traction battery of the electrified vehicle.

Another example of any of the foregoing methods includes connecting storage batteries of the first and second portable chargers in parallel when charging the traction battery.

Another example of any of the foregoing methods includes connecting electrical energy output from an electronic conversion module of the first portable charger in parallel with electrical energy output from an electronic conversion module of the second portable charger when charging the traction battery.

Another example of any of the foregoing methods includes controlling parameters of the electrical energy output from the electronic conversion module of the second portable charger using a controller module of the first portable charger.

In another example of any of the foregoing methods, the controller module of the first portable charger is configured to adjust a current of the electrical energy output from the electronic conversion module of the second portable charger.

Another example of any of the foregoing methods includes connecting storage batteries of the first and second portable chargers in parallel when charging the traction battery. The method further includes connecting electrical energy output from an electronic conversion module of the first portable charger in parallel with electrical energy output from an electronic conversion module of the second portable charger when charging the traction battery.

Another example of any of the foregoing methods includes connecting electrical energy output from an electronic conversion module of the first portable charger in series with electrical energy output from an electronic conversion module of the second portable charger when charging the traction battery.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a portable charger that can be used to charge various loads, such as, for example, a traction battery of an electrified vehicle. The portable charger can be operably connected to another portable charger in various configurations to provide more electrical energy to the load.

Figure 1:
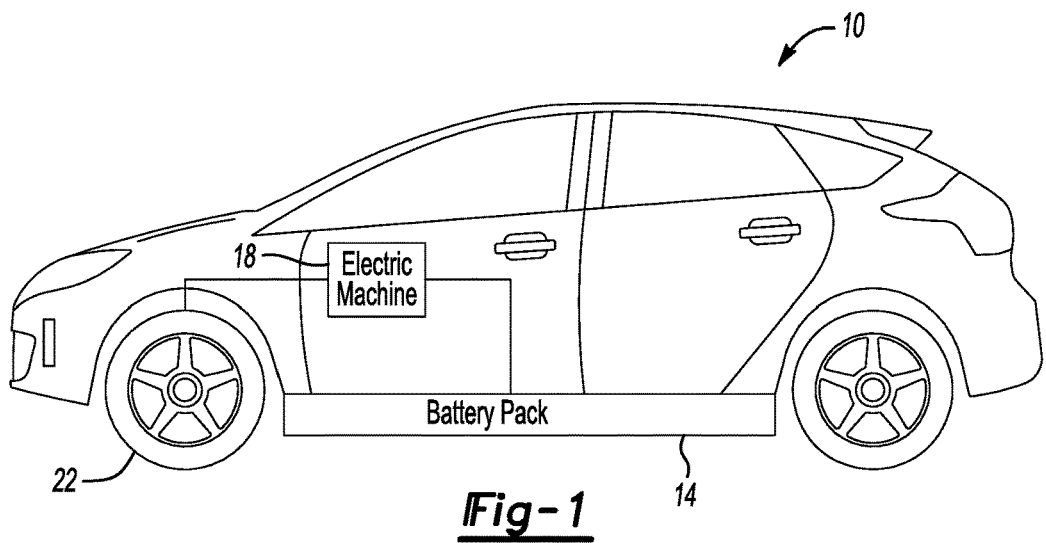
FIG. 1 illustrates a partially schematic side view of an electrified vehicle.

Referring to FIG. 1, an exemplary electrified vehicle 10 includes a traction battery 14 that stores electrical energy used to power an electric machine 18. When powered, the electric machine 18 generates torque to drive one or more vehicle drive wheels 22. The exemplary electrified vehicle 10 is an all-electric vehicle. The electrified vehicle 10, in other examples, could be another type of an electrified vehicle incorporating a traction battery, such as a plug-in hybrid electric vehicle (PHEV). The traction battery 14 can be recharged more electrical energy when required from a grid source.

Figure 2:
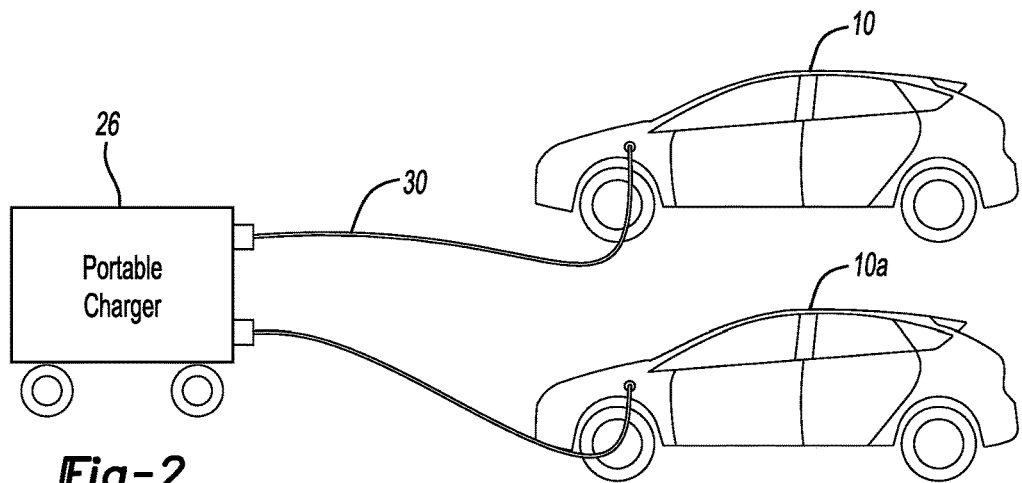
FIG. 2 illustrates a portable charger charging a traction battery of the electrified vehicle of FIG. 1 and a traction battery of another electrified vehicle.

Referring now to FIG. 2, with continued reference to FIG. 1, a portable charger 26 can instead be used to charge the traction battery 14. The portable charger 26 could be used when the grid source is not available.

When charging the traction battery 14 of the example electrified vehicle 10, a charge cord 30 is used to electrically couple the portable charger 26 to the electrified vehicle 10. Electrical energy can then move from the portable charger 26 to the traction battery 14. In this exemplary embodiment, the portable charger 26 is charging the electrified vehicle 10 as well as a second electrified vehicle 10a.

Figure 3:
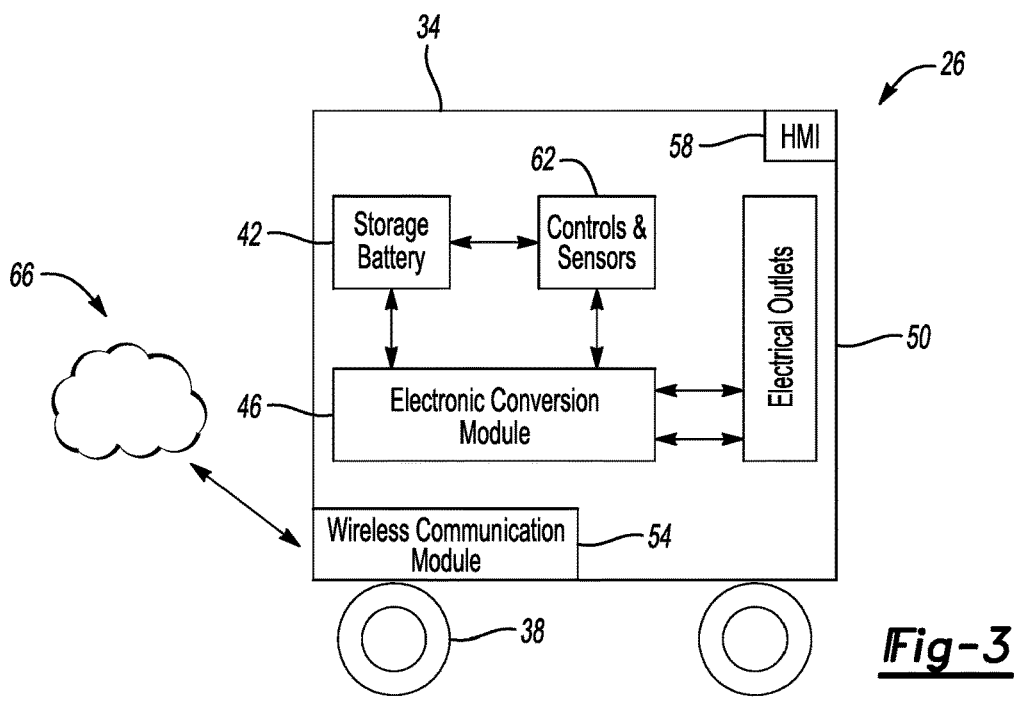
FIG. 3 illustrates a schematic view of the portable charger of FIG. 2.

With reference now to FIG. 3, the portable charger 26 includes a housing 34, a plurality of wheels 38, a storage battery 42, an electronic conversion module 46, electrical outlets 50, a wireless communication module 54, a human machine interface (HMI) 58, and controls and sensors 62.

The wheels 38 facilitate the portability of the portable charger 26. The portable charger 26 can, for example, be wheeled to a location of the electrified vehicle 10 requiring a charge of the traction battery 14. Movement of the portable charger 26 could be an autonomous movement. In another example, a user could push or drive the portable charger 26 to a desired location.

The storage battery 46 of the portable charger 26 stores the electrical energy that can be used to charge the traction battery 14. The storage battery 42 of the portable charger 26 could be charged at a first location, transported closer to the electrified vehicle 10, and then wheeled to a final position where the charge cord 30 can electrically couple the portable charger 26 to the electrified vehicle 10. When a level of charge in the storage battery 46 is low, the portable charger 26 could be recharged from a grid source. In some examples, the portable charger 26 could be returned to a central recharge station where the storage battery 46 is recharged.

The electronic conversion module 46 of the portable charger 26 can adjust parameters of the electrical energy flowing from the storage battery 42 prior to moving through the electrical outlets 50. The adjusted parameters could include a current, a voltage, or both. For example, if the traction battery 14 can be charged via a Direct Current (DC) fast charge procedure, the electronic conversion module 46 can adjust a voltage of the electrical energy from the storage battery 42 to 220 Volts. The electrical energy adjusted by the electronic conversion module 46 is then provided to the electrical outlets 50 as adjusted electrical energy. The electrical energy adjusted by the electronic conversion module 46 then flows through the charge cord 30 to the electrified vehicle 10.

The electronic conversion module 46 can include, for example, semiconductor switches (e.g. IGBT, MOSFET), electronic boards (gate drives), sensors (Voltage, temperature, current), mechanical interconnections (Copper or aluminum bus bars), and inlets/outlets for electrical connections. In some examples, the electronic conversion module 46 could be cooled with air or liquid coolant. Inlets and outlets for coolant flow could be provided.

Passive elements (such as resistors, inductive transformers), micro controller unit, communication lines The wireless communication module 54 of the portable charger 26 can communicate with an at least partially cloud-based communication module 66 that is external to the portable charger 26. Communications between the cloud-based communication module 66 and the wireless communication module 54 of the portable charger 26 could include relaying a location of the electrified vehicle 10 to the portable charger 26 as well as, for example, desired parameters for the electrical energy provided by the portable charger 26.

The HMI 58 of the portable charger 26 can receive inputs from a user. Via the HMI 26, the user could command the portable charger 26 to begin charging the traction battery 14 of the electrified vehicle 10, to stop charging the electrified vehicle 10, or to provide electrical energy having specific parameters, 220 Volts, for example.

The controls and sensors 62 of the portable charger 26 act as a control module that can monitor, among other things, the various components of the portable charger 26. For example, the controls and sensors 62 can identify an amount of charge remaining in the storage battery 42, whether power is communicating through the electrical outlets 50, and the types of conversions carried out by the electronic conversion module 46.

Figure 4:
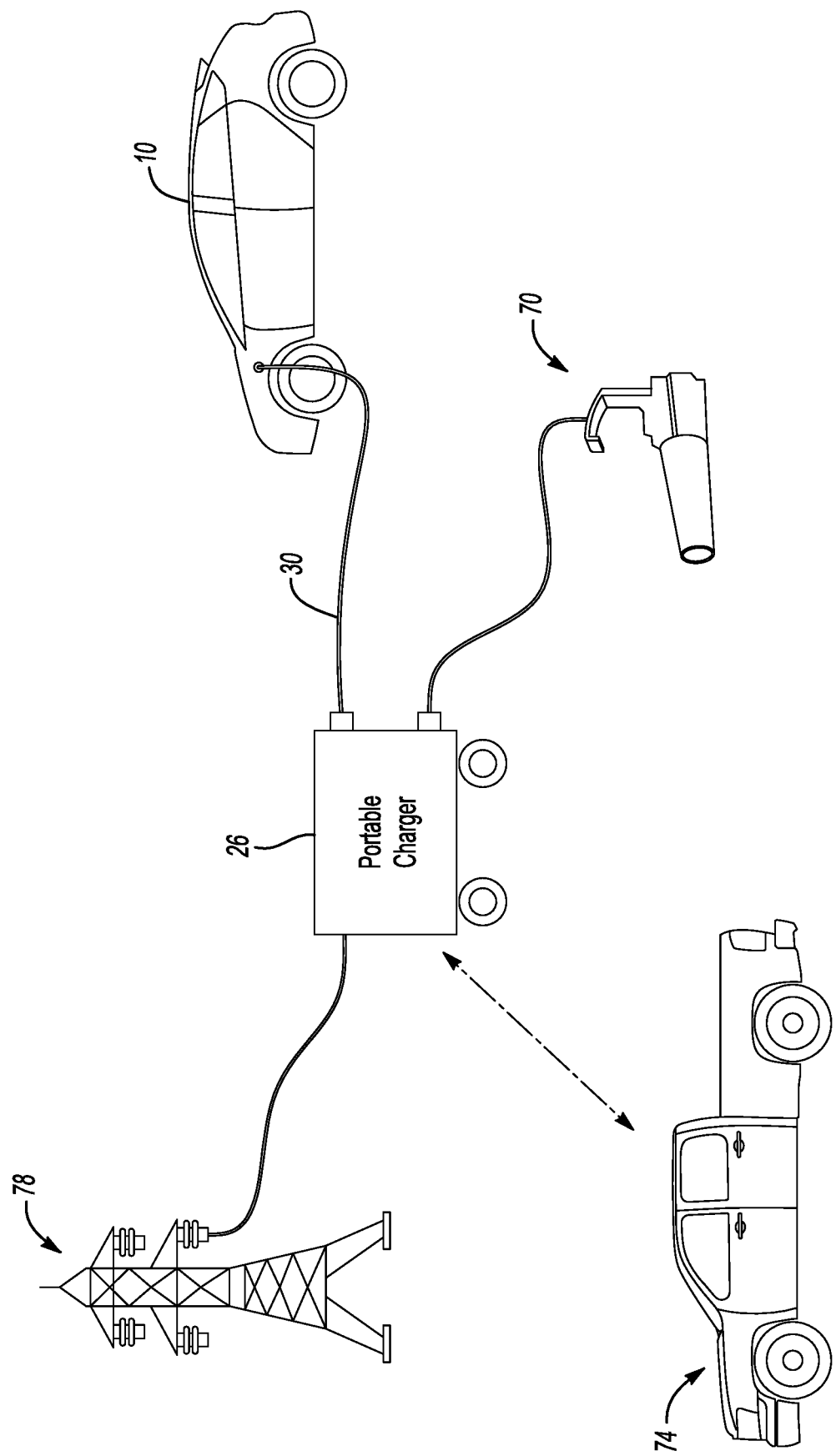
FIG. 4 illustrates the portable charger of FIG. 2 charging the traction battery of the electrified vehicle and interfacing other loads.
Figure 5:
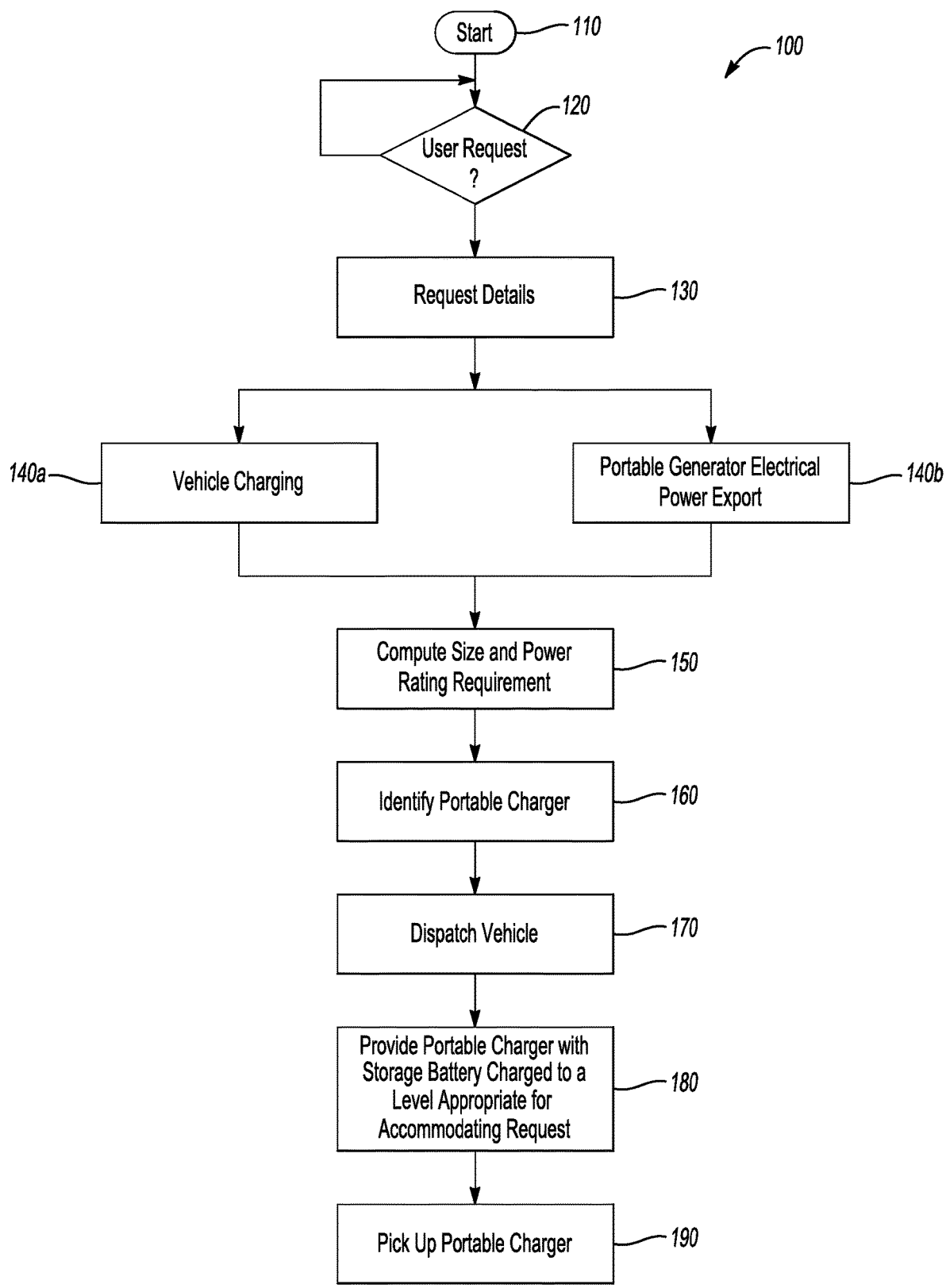
FIG. 5 illustrates a flow of a method of use associated with the portable charger of FIG. 2 according to an exemplary aspect of the present disclosure.

With reference now to FIG. 4, the portable charger 26 can be used to charge loads instead of, or in addition to, the electrified vehicle 10. For example, the portable charger 26 could be moved to a job site to provide electrical energy to tools 70. Other loads powered by the portable charger 26 could include one or more residential homes or events such as concerts. The portable charger 26 having a particular size and scale can be selected based on the loads requiring electrical energy.

A portable charger transport vehicle 74 could be used to transport the portable charger 26 to the job site having the tools 70, or to the location of the electrified vehicle 10. The transport vehicle 74 could also be used as a service vehicle to transport a user to the location of the portable charger 26 for servicing the portable charger 26.

The portable charger 26 can rely on a grid source 78 to recharge the storage battery 42. In some examples, the transport vehicle 74 transports the portable charger 26 from a position where the storage battery 42 can be charged from the grid source 78 to the location of the electrified vehicle 10, or the location of the tools 70.

In some examples, the storage battery 42 can be used to provide power back to the grid source 78, if required. For example, if the electrified vehicle 10 has a level of charge in the traction battery 14 in excess of what is required, electrical energy can be transferred from the electrified vehicle 10 back to the storage battery 42 of the portable charger 26, and then fed back to the grid source 78. Thus, in such an example, the portable charger 26 is designed for bi-directional power flow capability.

With reference now to FIGS. 1, 3, 4, and 5, an exemplary method 100 of use associated with the portable charger 26 includes dispatching the portable charger 26 from a portable charger distribution center. Portable chargers of various types can be stored at the portable charger distribution center.

The method 100 begins at a step 110. Next, at a step 120, the method 100 assesses whether or not a user of the electrified vehicle 10 has requested use of the portable charger 26 for a recharge of the traction battery 14. If no request is received, the method 100 continues to monitor.

If a user does request the recharge, the method 100 moves to a step 130. The user may be in a parking lot, for example, and send a request to the cloud-based communication module 66 requesting a recharge of the traction battery 14 from the portable charger 26. The cloud-based communication module 66 relays the request to the portable charger distribution center.

At the step 130, the method 100 requests or otherwise obtains details associated with the charge. Details could include the user identifying at a step 140*a* that a charge of the electrified vehicle 10 is desired, or at a step 140*b* that a charge of a one or more tools 70 is desired.

The method 100 then moves to a step 150 where a required size and power rating requirement is calculated based on the user request. The portable charger distribution center may include portable chargers of various sizes and storage battery capacities. Based on the size and power rating requirement, a particular type of portable charger 26 can be selected. If, for example, the request is for a relatively large amount of electrical energy, a portable charger capable of having more electrical energy stored in the storage battery may be selected.

Notably, the size of the portable charger 26 can vary in response to the size of the storage battery 42. For example, a portable charger for charging a single electrified vehicle may be only as big as a suitcase. A portable charger for charging multiple electrified vehicles could be as big as an outdoor grill. A portable charger used for providing emergency power to multiple residential homes or for events could be as large as a shipping container.

The method 100 then moves to a step 160 which identifies a transport vehicle, such as the transport vehicle 74, capable of transporting the portable charger 26 having the appropriate size and power rating to fulfill the request 140*a* or 140*b*. The transport vehicle 74 can transport the portable charger 26 in a cargo bed. The transport vehicle 74 could tow the portable charger 26 in another example.

The transport vehicle 74 is then dispatched to the location where the portable charger 26 can address the request at a step 170. The portable charger 26 is then provided at a step 180. The portable charger 26 that is provided with the storage battery 42 having an appropriate level of charge for accommodating the user request. If the amount of charge required in the request is more than the storage battery 42 of a single portable charger can provide, more than one portable charger 26 could be dispatched as will be later explained.

In connection with providing the portable charger, the portable charger 26 may be activated by a driver of the transport vehicle 74. The driver of the transport vehicle 74 may also accept a payment from the user requesting the portable charger 26. After the portable charger 26 is used to charge the traction battery 14 of the electrified vehicle 10, or another load, the transport vehicle 74 can pick up the portable charger at a step 190 and transport the portable charger 26 back to the portable charger distribution center or to another location where the storage battery 42 can be recharged.

Figures 6, 7:
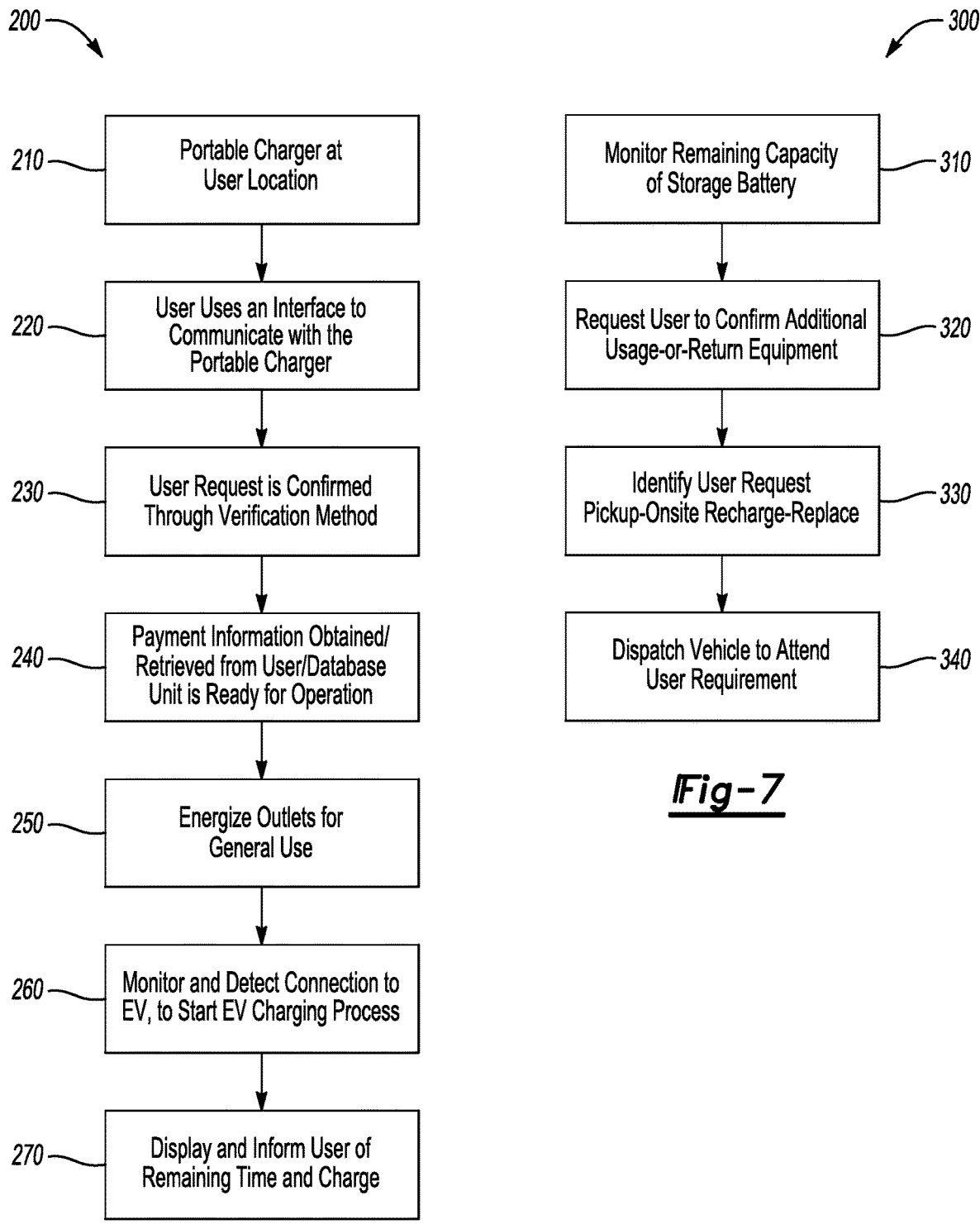
FIG. 6 illustrates a flow of a method of use associated with the portable charger of FIG. 2 according to another exemplary aspect of the present disclosure.
FIG. 7 illustrates a flow of a method of use associated with the portable charger of FIG. 2 according to yet another exemplary aspect of the present disclosure.

With reference now to FIG. 6 and continuing reference to FIGS. 1, 3, and 4, another exemplary method 200 of use associated with the portable charger 26 can occur when the portable charger 26 is nearby a location of the user requesting a recharge from the portable charger 26. For example, the user making the request could be located in a parking lot, and the portable charger 26 is one of a plurality of portable chargers positioned near the parking lot to accommodate requests for recharging from users of vehicles within the parking lot.

The method 200 begins at a step 210 where the portable charger 26 is nearby the location of the user. At a step 220, the user, via an interface, communicates with the portable charger 26 to request a recharge. Next, at a step 230, the portable charger 26 verifies the request. Verification may include ascertaining whether or not the user is authorized to request the recharge from the portable charger 26.

Next, at a step 240, the user may relay payment information for the recharge. The payment information could be obtained directly from the user, or from a user account within the cloud-based communication module 66. After payment is authorized by the portable charger 26, the cloud-based communication module 66, or both, the electrical outlets 50 of the portable charger are activated at a step 250. Activating of the electrical outlets 50 can be in response to a command from the controls and sensors 62. The activating of the electrical outlets 50 permits the user to receive power from the portable charger 26 through the electrical outlets 50.

After the electrical outlets 50 are activated the traction battery 14 can be charged utilizing the portable charger 26. During the charging, the method 200 monitors and detects the connection to the electrified vehicle 10 at a step 260. At a step 270, the HMI 58 of the portable charger 26 can display and inform the user of a remaining time required to charge the traction battery 14, an amount of charge in the traction battery 14, or both.

With reference now to FIG. 7 and continuing reference to FIGS. 1, 3, and 4, another exemplary method 300 of use associated with the portable charger 26 can include a step 310 of monitoring the remaining capacity of the storage battery 42 of the portable charger 26. At a step 320, the portable charger 26 may request that a user confirms additional usage of the portable charger 26 or that the user returns the portable charger 26 to a portable charger distribution center.

At a step 330, the user request is acknowledged and responded to. The response to the user request could include the transport vehicle 74 being dispatched to pick up the portable charger 26, to recharge the portable charger 26, or to replace the portable charger 26. Next, at step 340, the transport vehicle 74 is dispatched to pick up, recharge, or replace the portable charger 26.

Figure 8:
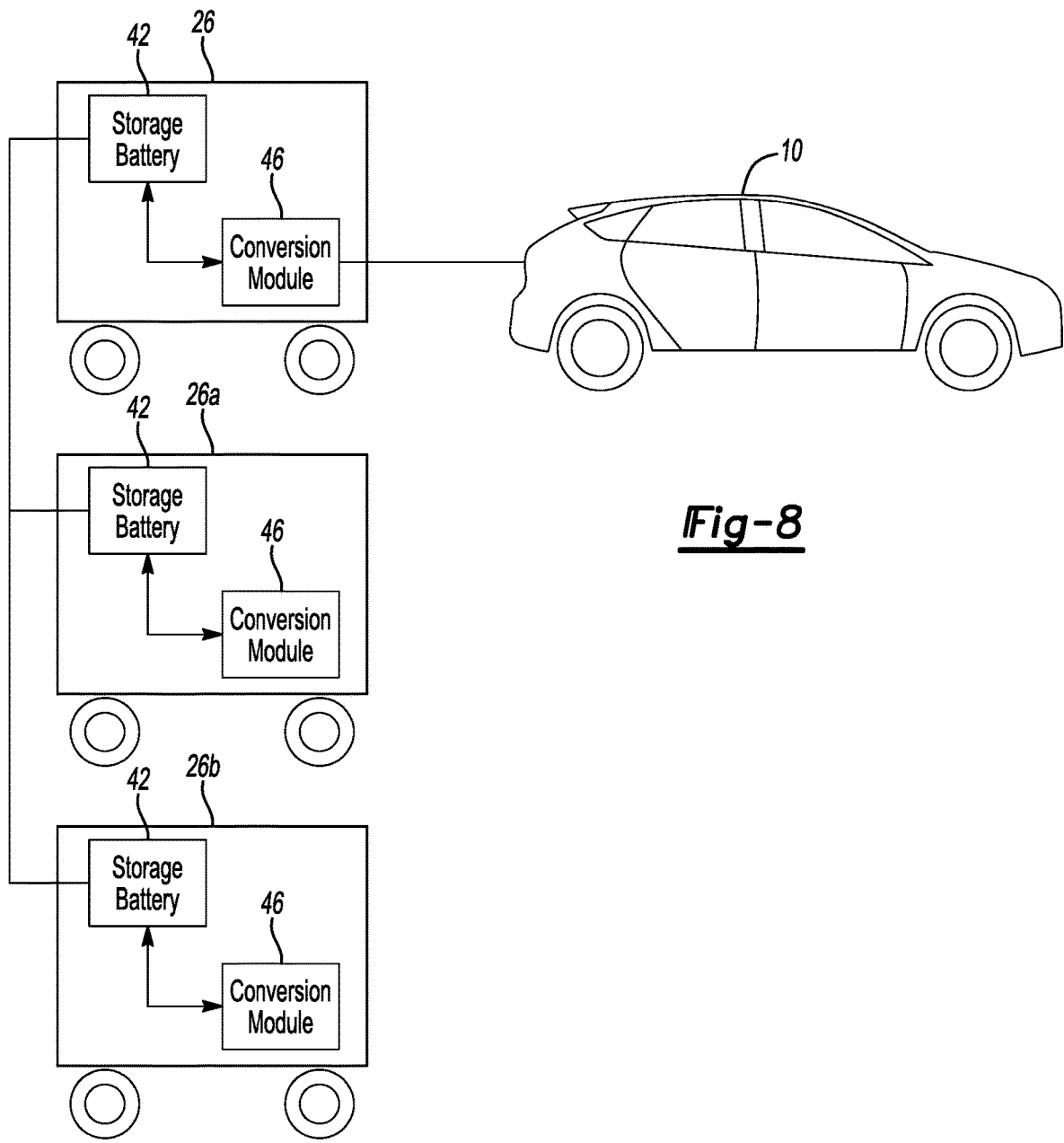
FIG. 8 illustrates a charging system that incorporate the portable charger of FIG. 2 and other portable chargers according to an exemplary configuration.

With reference now to FIG. 8, the portable charger 26 can be combined with other portable chargers 26a and 26b to provide a charging system configuration that charges the traction battery 14 of the electrified vehicle 10. When combined, the portable charger 26 is electrically coupled to the electrified vehicle 10 to charge the traction battery of the electrified vehicle. The portable chargers 26a and 26 are also electrically coupled to the electrified vehicle 10 to charge the traction battery.

In the charging system of FIG. 8, the charging system has a first configuration where the storage batteries 42 of the portable chargers 26, 26a, and 26b are connected in parallel when charging the traction battery of the electrified vehicle 10. Electrical energy from the storage batteries 42 of the portable chargers 26, 26a, and 26b moves through the electronic conversion module 46 of the portable charger 26. This can require the portable charger 26 to have components of the electronic conversion module 46 and other components that are rated high enough to accommodate electrical energy from the portable charger 26 as well as the portable chargers 26a and 26b.

Figure 9:
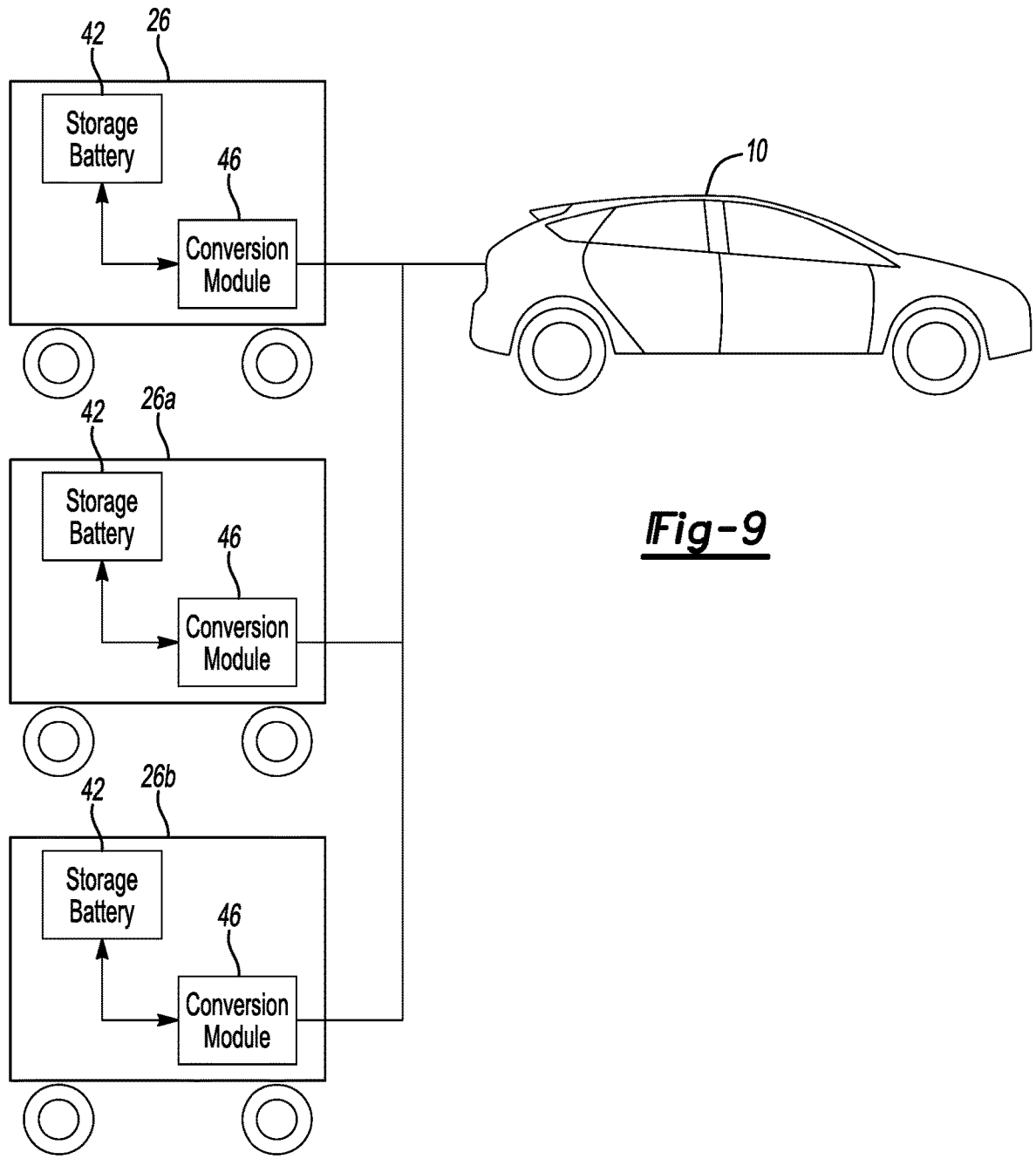
FIG. 9 illustrates a charging system that incorporate the portable charger of FIG. 2 and other portable chargers according to another exemplary configuration.

With reference to FIG. 9, a charging system configuration according to another exemplary non-limiting embodiment is configured such that the electrical output from the electronic conversion modules 46 of the portable chargers 26, 26a, and 26b is connected in parallel when charging the traction battery of the electrified vehicle 10. In contrast to the configuration of FIG. 8, the electronic conversion modules 46 of the configuration of FIG. 9 require components rated to accommodate power from the storage battery 42 of the respective portable charger 26, 26a, or 26b.

To control the flow of electrical energy from the electronic conversion modules 46, the portable charger 26 may communicate with the other portable chargers 26a and 26b in a master/slave type relationship. The communications could be wireless and sent and received from the wireless communication modules 54 (FIG. 3) of the portable chargers 26, 26a, 26b. The controllers and sensors 62 (FIG. 3) of the portable charger 26 act as a control module that controls the communications to the portable chargers 26a and 26b to control electrical energy output from the portable chargers 26a and 26b.

The portable charger 26 could, for example, command the portable charger 26a to provide electrical energy at a particular current, for example, and the portable charger 26B to provide electrical energy at a particular current. If, for example, the traction battery 14 of the electrified vehicle 10 requires a current I, the portable charger 26 could adjust the electronic conversion modules 46 of the portable chargers 26, 26a, and 26b to each provide electrical energy at I/3.

Figure 10:
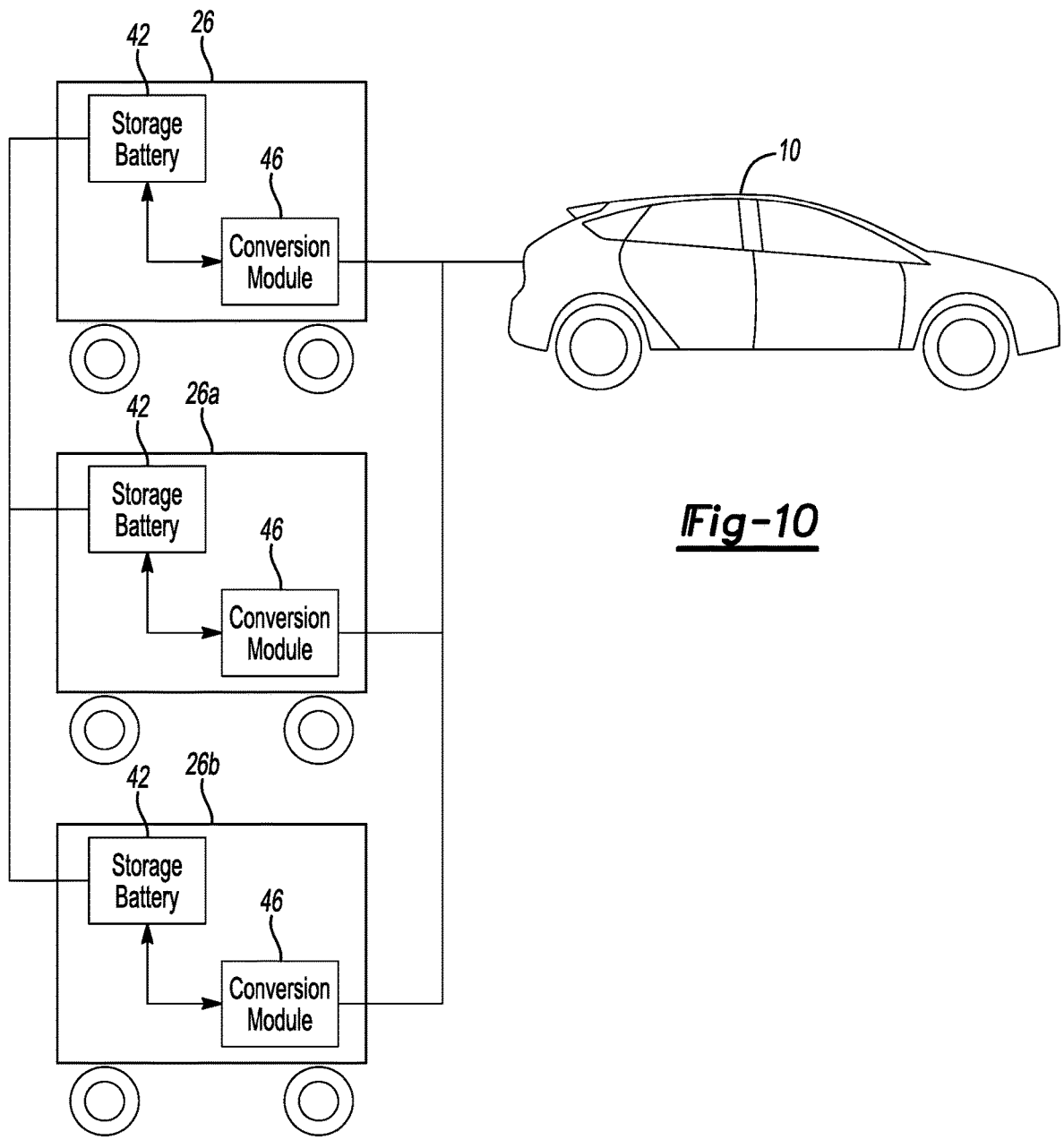
FIG. 10 illustrates a charging system that incorporate the portable charger of FIG. 2 and other portable chargers according to yet another exemplary configuration.

With reference to FIG. 10, a charging system configuration according to yet another exemplary non-limiting embodiment is configured such that the electrical energy output from the portable chargers 26, 26a, and 26b is connected in parallel when charging the traction battery 14 of the electrified vehicle 10. The configuration of FIG. 10 may be used to provide power to something other than the electrified vehicle 10 shown, such as the grid or a home. The configuration of FIG. 10 could be used, for example, to provide a relatively small amount of power for a relatively long duration, e.g., powering a home for say three days.

The configuration of FIG. 10 could be used when the portable chargers 26, 26a, and 26b are charged on a delivery vehicle that transports the portable chargers 26, 26a, and 26b to the location of the electrified vehicle 10. In such an example, the delivery vehicle could carry the portable chargers 26, 26a, 26b while they are connected to a common DC bus. Multiple converters could be used when charging the portable chargers 26, 26a, and 26b from the DC bus to ensure that that the storage batteries 42 appropriately share the power from the DC bus.

Figure 11:
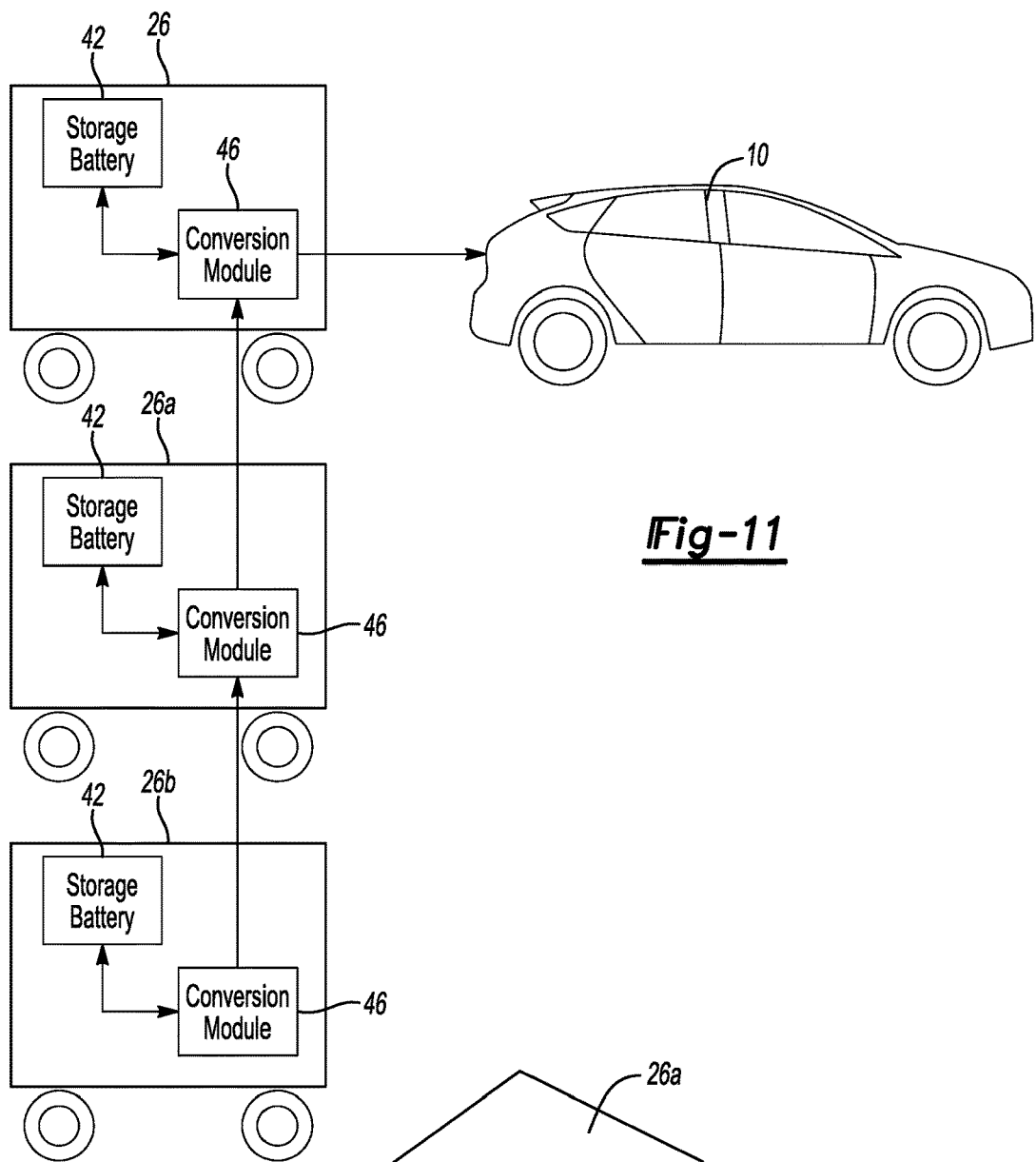
FIG. 11 illustrates a charging system that incorporate the portable charger of FIG. 2 and other portable chargers according to yet another exemplary configuration.

With reference to FIG. 11, a charging system configuration according to still another exemplary non-limiting embodiment is configured such that the electrical output from the portable chargers 26, 26a, and 26b is connected in series when charging the traction battery of the electrified vehicle 10.

The series connection may permit powering a high voltage load requirement associated with the electrified vehicle 10, or another load. For example, if the electrical energy from the portable chargers 26, 26a, and 26b is each 100 Volts, the output to the electrified vehicle 10 would be 300 Volts when the outputs from the portable chargers 26, 26a, and 26b are connected in series.

If the portable chargers 26, 26a, and 26b are connected in series, the isolation rating for the components of the portable chargers 26, 26a, and 26b may need to be as high as the number of portable chargers linked together in series.

General electrical connection cables can be used to interconnect the storage batteries 42, the outputs from the power conversion modules 46, or both, of the portable chargers 26, 26a, and 26b shown in FIGS. 8-11.

Figure 12:
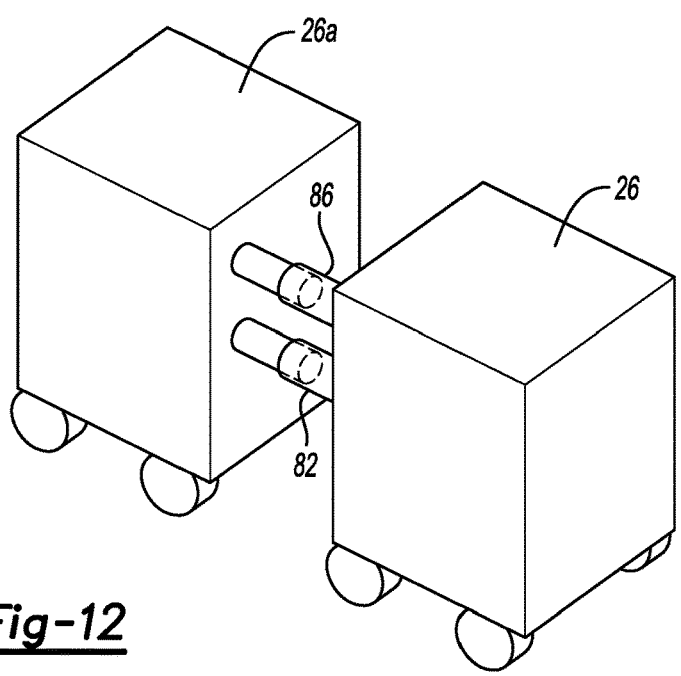
FIG. 12 illustrates a perspective view of the portable charger of FIG. 2 interconnected with another portable charger.

FIG. 12 illustrates another example interconnection between the portable charger 26a and the portable charger 26. The interconnection can involve a positive connector 82 of the portable charger 26 receiving a positive connector of the portable charger 26*a* and a negative connector 86 of the portable charger 26 receiving a corresponding negative connector of the portable charger 26*a*.

Features of the examples of this disclosure can include providing portable chargers having a modular type construction to accommodate varied load requirements. The portable chargers can, in some examples, have components connected in parallel or in series.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charging system, comprising:
a first portable charger that electrically couples to an electrified vehicle to charge a traction battery of the electrified vehicle while a second portable charger is providing electrical energy to charge the traction battery, wherein the first and second portable chargers each include a storage battery and an electronic conversion module, the electronic conversion module configured to adjust parameters of electrical energy received from the respective storage battery to provide adjusted electrical energy that charges the traction battery.

2. The charging system of claim 1, wherein the storage batteries of the first and second portable chargers are connected in parallel when charging the traction battery.

3. The charging system of claim 1, wherein electrical energy output from the electronic conversion modules is connected in parallel when charging the traction battery.

4. The charging system of claim 1, wherein the storage batteries of the first and second portable chargers are connected in parallel when charging the traction battery, wherein electrical energy output from the electronic conversion modules is combined in parallel when charging the traction battery.

5. The charging system of claim 1, wherein electrical energy output from the electronic conversion modules is connected in series when charging the traction battery.

6. The charging system of claim 1, wherein the first and second portable chargers are interconnected to each other when charging the traction battery.

7. The charging system of claim 1, further comprising at least one third portable charger, the first portable charger configured to electrically couple to the electrified vehicle to charge the traction battery while the second portable charger is providing electrical energy to charge the traction battery, and while the at least one third portable charger is also providing electrical energy to charge the traction battery.

8. The charging system of claim 1, wherein the electrified vehicle is a first electrified vehicle and the first portable charger is configured to electrically couple to both the first electrified vehicle and a second electrified vehicle to charge traction batteries of the first and second electrified vehicles simultaneously.

9. The charging system of claim 1, wherein the first portable charger is configured to feed electrical energy to an electrical grid.

10. A charging system, comprising:
a first portable charger that electrically couples to an electrified vehicle to charge a traction battery of the electrified vehicle while a second portable charger is providing electrical energy to charge the traction battery, the first and second portable chargers each including a storage battery and an electronic conversion module, the electronic conversion module configured to adjust parameters of electrical energy received from the respective storage battery to provide adjusted electrical energy that charges the traction battery; and
a controller module of the first portable charger that controls electrical energy output from the electronic conversion module of the second portable charger, wherein electrical energy output from the electronic conversion modules is connected in parallel when charging the traction battery.

11. The charging system of claim 10, wherein the controller module of the first portable charger is configured to adjust a current of the electrical energy output from the electronic conversion module of the second portable charger.

12. A charging method, comprising:
electrically coupling both a first and a second portable charger to an electrified vehicle to charge a traction battery of the electrified vehicle using electrical energy from both the first and the second portable chargers; and
receiving electrical energy from a storage battery of the first portable charger and using an electronic conversion module of the first portable charger to provide adjusted electrical energy that is used to charge the traction battery of the electrified vehicle, and receiving electrical energy from a storage battery of the second portable charger and using an electronic conversion module of the second portable charger to provide adjusted electrical energy that is used to charge the traction battery of the electrified vehicle.

13. The charging method of claim 12, further comprising connecting storage batteries of the first and second portable chargers in parallel when charging the traction battery.

14. The charging method of claim 12, further comprising connecting storage batteries of the first and second portable chargers in parallel when charging the traction battery, and further comprising connecting electrical energy output from an electronic conversion module of the first portable charger in parallel with electrical energy output from an electronic conversion module of the second portable charger when charging the traction battery.

15. The charging method of claim 12, further comprising connecting electrical energy output from an electronic conversion module of the first portable charger in series with electrical energy output from an electronic conversion module of the second portable charger when charging the traction battery.

16. The charging method of claim 12, further comprising connecting electrical energy output from an electronic conversion module of the first portable charger in parallel with electrical energy output from an electronic conversion module of the second portable charger when charging the traction battery.

17. The charging method of claim 16, further comprising controlling parameters of the electrical energy output from the electronic conversion module of the second portable charger using a controller module of the first portable charger.

18. The charging method of claim 17, wherein the controller module of the first portable charger is configured to adjust a current of the electrical energy output from the electronic conversion module of the second portable charger.

\* \* \* \* \*